United States Patent
Won et al.

(10) Patent No.: US 7,760,240 B2
(45) Date of Patent: Jul. 20, 2010

(54) METHOD OF CONTROLLING DIGITAL PHOTOGRAPHING APPARATUS, AND DIGITAL PHOTOGRAPHING APPARATUS USING THE METHOD

(75) Inventors: Jung-yoon Won, Seongnam-si (KR); Dong-min Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1584 days.

(21) Appl. No.: 11/038,860

(22) Filed: Jan. 19, 2005

(65) Prior Publication Data
US 2006/0055816 A1    Mar. 16, 2006

(30) Foreign Application Priority Data
Sep. 10, 2004    (KR) ...................... 10-2004-0072461

(51) Int. Cl.
H04N 5/225    (2006.01)
H04N 5/238    (2006.01)

(52) U.S. Cl. .................................... 348/220.1; 348/363

(58) Field of Classification Search ............. 348/220.1, 348/221.1, 223.1, 231.1, 363, 240.99
See application file for complete search history.

(56) References Cited

U.S. PATENT DOCUMENTS

| 6,965,410 | B1 * | 11/2005 | Yamagishi | 348/362 |
| 7,372,504 | B2 * | 5/2008 | Fujimura | 348/231.8 |
| 2001/0014214 | A1 | 8/2001 | Hayashi et al. | |
| 2001/0030694 | A1 * | 10/2001 | Abe | 348/223 |
| 2003/0043284 | A1 * | 3/2003 | Kitajima et al. | 348/231.4 |
| 2004/0090533 | A1 * | 5/2004 | Dow et al. | 348/220.1 |
| 2004/0119876 | A1 | 6/2004 | Ohmori et al. | |
| 2005/0157184 | A1 * | 7/2005 | Nakanishi et al. | 348/220.1 |

FOREIGN PATENT DOCUMENTS

JP    10-042250    *    2/1998
WO    WO 03/028364 A1    4/2003

* cited by examiner

Primary Examiner—Nhan T Tran
(74) Attorney, Agent, or Firm—Drinker Biddle & Reath LLP

(57) ABSTRACT

Provided is a method of controlling a digital photographing apparatus in which when a shutter release button is pressed while in one of a plurality of still image photographing modes, a still image is photographed according to a photographing condition of the still image photographing mode. If the shutter release button is pressed together with one of a plurality of setting buttons in the still image photographing mode, a moving picture is photographed according to the photographing condition of the still image photographing mode.

16 Claims, 13 Drawing Sheets

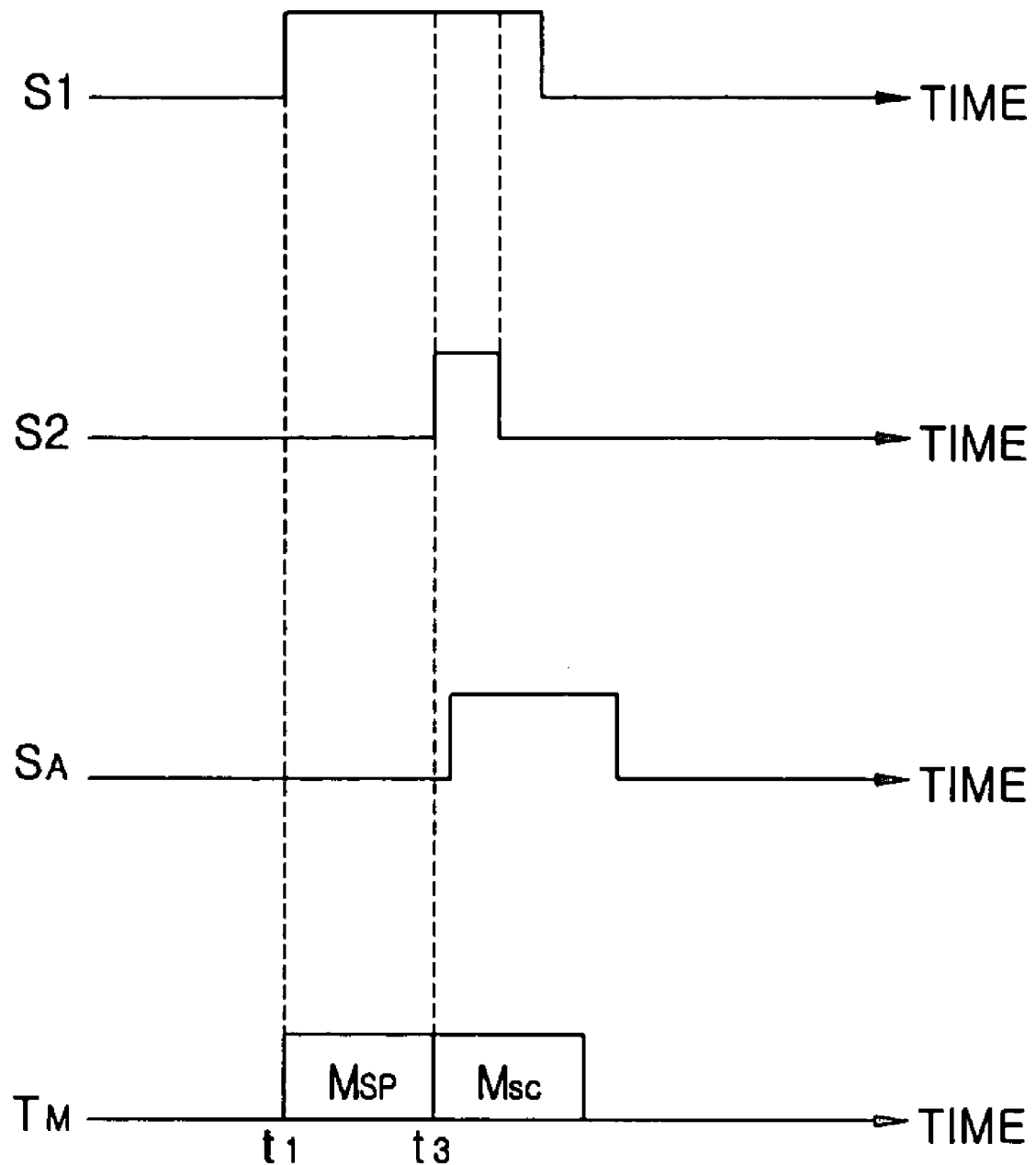

METHOD OF CONTROLLING DIGITAL PHOTOGRAPHING APPARATUS, AND DIGITAL PHOTOGRAPHING APPARATUS USING THE METHOD

CROSS-REFERENCE TO RELATED PATENT APPLICATIONS

This application claims the priority of Korean Patent Application No. 10-2004-0072461, filed on Sep. 10, 2004 in the Korean Intellectual Property Office, the disclosure of which is incorporated herein in its entirety by reference.

BACKGROUND OF THE INVENTION

1. Field of the Invention

The present invention relates generally to a digital photographing apparatus, and more particularly to a method of controlling a digital photographing apparatus in which a still image is photographed when a shutter release button is pressed in one of a plurality of still image photographing modes according to a photographing condition of the still image photographing mode.

2. Description of the Related Art

A typical digital photographing apparatus, e.g., a digital camera disclosed in U.S. Patent Publication No. 2004-119,876, entitled "Method of Notification of Inadequate Picture Quality, published in 2004, operates in a moving picture photographing mode and various still image photographing modes. In more detail, when a shutter release button is pressed after a user selects a still image photographing mode via a mode dial or a slide button, a still image is photographed according to a still image photographing condition of the selected still image photographing mode. In addition, when the shutter release button is pressed after a user selects a moving picture photographing mode via the mode dial or the slide button, a moving picture is photographed according to a predetermined standard photographing condition of the moving picture photographing mode.

Therefore, according to a typical digital photographing apparatus such as the digital camera described above, a user can only use one moving picture photographing mode. Further, it may be difficult to switch from the moving picture photographing mode to one of the still image photographing modes and vice versa.

SUMMARY OF THE INVENTION

The present invention provides a method of controlling a digital photographing apparatus in which a plurality of moving picture photographing modes can be effectively operated and a moving picture photographing mode can be easily converted to a still image photographing mode and vice versa.

According to one aspect, a method of controlling a digital photographing apparatus is provided in which, when a shutter release button is pressed while in one of a plurality of still image photographing modes, either a still image or a moving picture is photographed according to a photographing condition set for the still image photographing mode. For example, a user may photograph a moving picture when the digital photographing apparatus is set in a still image photographing mode and according to the set photographing condition of the still image photographing mode when the shutter release button is pressed together with an additional button, which may be one of a plurality of setting buttons that are used in the still image photographing mode.

Further, the plurality of still image photographing modes may be substituted for a plurality of moving picture photographing modes since moving pictures are photographed according to photographing conditions of the still image photographing modes. In addition, since whether to photograph a moving picture is determined by whether or not the additional button is pressed when the shutter release button is pressed, converting from the moving picture photographing mode to one of the still image photographing modes becomes easier.

According to another aspect a digital photographing apparatus which adopts the method is provided.

BRIEF DESCRIPTION OF THE DRAWINGS

The above and other features and advantages of the present invention will become more apparent by describing in detail exemplary embodiments thereof with reference to the attached drawings in which:

FIG. 13 is an additional timing diagram illustrating signals output from the shutter release button and the additional button for taking a still photograph with the camera.

DETAILED DESCRIPTION OF THE INVENTION

Figure 1:
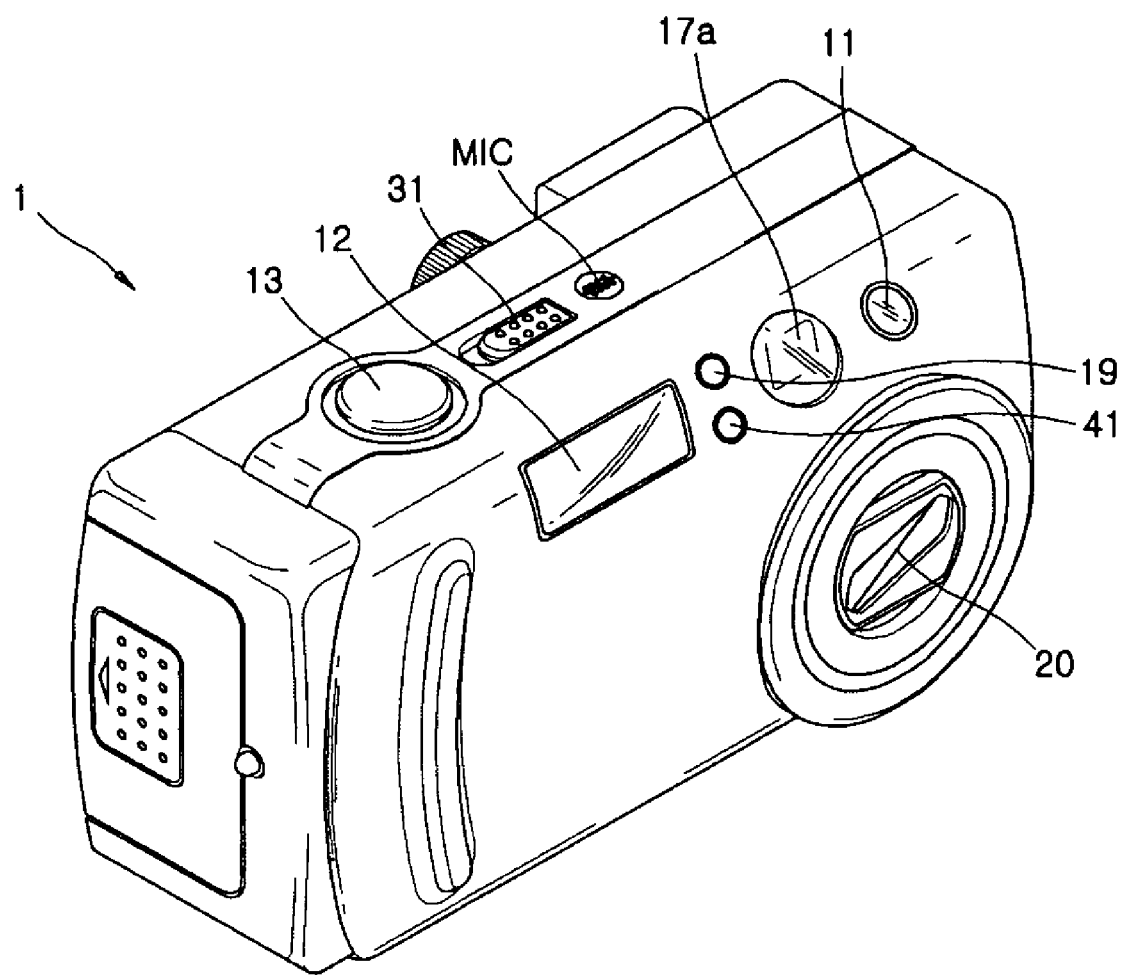
FIG. 1 is a perspective view of a digital camera, which is a digital photographing apparatus, illustrating the top and front thereof according to an embodiment of the present invention.

Referring to FIG. 1, a digital camera 1, which is a digital photographing apparatus according to an embodiment of the present invention, includes a self-timer lamp 11, a flash 12, a view finder 17a, a flash intensity sensor (FS) 19, a lens unit 20, and a remote receiver 41 on its front surface; and a microphone MIC, a shutter release button 13, and a power button 31 on its top surface.

When in a self-timer mode, the self-timer lamp 11 illuminates for a predetermined amount of time after the shutter release button 13 is pressed until the capturing of an image begins. The FS 19 senses the flash intensity when the flash 12 operates and communicates a sensed flash intensity value to a digital signal processor (DSP) 507 (see FIG. 3) via a micro-controller 512 (see FIG. 3). The remote receiver 41 receives a command signal, e.g., a photographing command signal from a remote control (not shown), and inputs the photographing command signal to the DSP 507 via the micro-controller 512.

The shutter release button 13 has a two-step structure. That is, if the shutter release button 13 is pressed to a first step, a first signal S1 output from the shutter release button 13 is activated, and if the shutter release button 13 is pressed to a second step, a second signal S2 output from the shutter release button 13 is activated.

Figure 2:
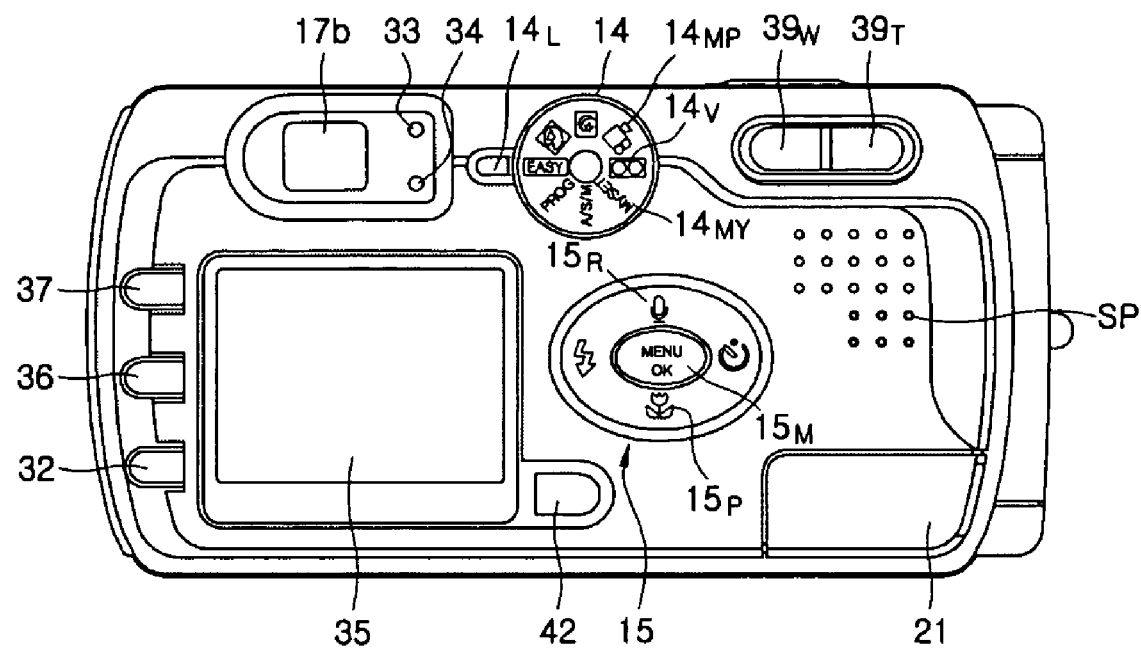
FIG. 2 is a rear view of the digital camera of FIG. 1.

Referring to FIG. 2, a mode dial 14, function buttons 15, a manual-focus/delete button 36, a manual-change/play button 37, a reproducing mode button 42, a speaker SP, a monitor button 32, an automatic-focus lamp 33, a view finder 17b, a flash standby lamp 34, a color liquid crystal display (LCD) panel 35, a wide-angle zoom button $39_W$, a telephoto zoom button $39_T$, and an external interface unit 21 are provided at the back of the digital camera 1.

The mode dial 14 is used to select one operating mode from a number of operating modes including, for example, a simple photographing mode, a program photographing mode, a portrait photographing mode, a night scene photographing mode, a manual photographing mode, a moving picture photographing mode $14_{MP}$, a user setting mode $14_{MY}$, and a recording mode $14_V$. Here, all of the foregoing mentioned photographing modes are still image photographing modes except for the moving picture (i.e., movie) photographing mode.

For reference, the user setting mode $14_{MY}$ is used by a user to set photographing information for customizing the still image or moving picture photographing modes.

The recording mode $14_V$ is used to record only sound, for example, a voice of a user. After converting to the recording mode, if the user presses the shutter release button 13 a first time, an audio file is generated in a memory card, which is an exemplary recording medium, and sound is stored in the audio file. If the user presses the shutter release button 13 again, input audio data that is being stored in the audio file is stopped and the audio file is completed.

The function buttons 15 are used to perform specific functions of the digital camera 1 and are also used as direction-movement buttons, akin to a joypad or the like, to move an activated cursor on a menu screen of the color LCD panel 35.

For example, close-up automatic focusing is set if a user presses a macro/down-movement/stop-continue button $15_P$ when in the moving picture or still image photographing modes. Further, if the user presses the macro/down-movement/stop-continue button $15_P$ while a menu for setting a condition of one of the operating modes is displayed by pressing a menu/select-confirm button $15_M$, an activated cursor moves downwards.

On the other hand, if the user presses an audio-memo/up-movement button $15_R$, 10 seconds of audio may be recorded, for example, immediately after a photographing operation is completed. Moreover, if the user presses the audio-memo/up-movement button $15_R$ while a menu for setting a condition of one of the operating modes is displayed by pressing the menu/select-confirm button $15_M$, an activated cursor moves upwards. Also, if the user presses the menu/select-confirm button $15_M$ when the activated cursor highlights one of selecting items, an operation corresponding to the selected item is performed.

The manual-focus/delete button 36 is used to either manually focus or delete an image in the photographing mode. The manual-change/play button 37 is used to manually change specific conditions and perform functions such as stopping or playing a moving picture in a reproducing mode. The reproducing mode button 42 is used when switching to the reproducing mode or a preview mode from a photographing mode.

The monitor button 32 is used to control the operation of the color LCD panel 35. For example, if the user presses the monitor button 32 a first time in a photographing mode, an image of a subject and photographing information of the image is displayed on the color LCD panel 35. If the monitor button 32 is pressed a second time the color LCD panel 35 is turned off. Also, if the user presses the monitor button 32 for the first time when the camera 1 is in a reproducing mode while an image file is being reproduced (i.e., displayed), photographing information of the image file (e.g., image resolution, file name, etc.) that is being reproduced is displayed on the color LCD panel 35. If the user presses the monitor button 32 a second time when the camera 1 is in a reproducing mode while an image file is being reproduced (i.e., displayed), only an image is displayed.

The automatic-focus lamp 33 operates when an image is well focused. The flash standby lamp 34 operates when the flash 12 (see FIG. 1) is in a standby mode (e.g., recharging). A mode indicating lamp $14_L$ indicates a selected mode of the mode dial 14.

Figure 3:
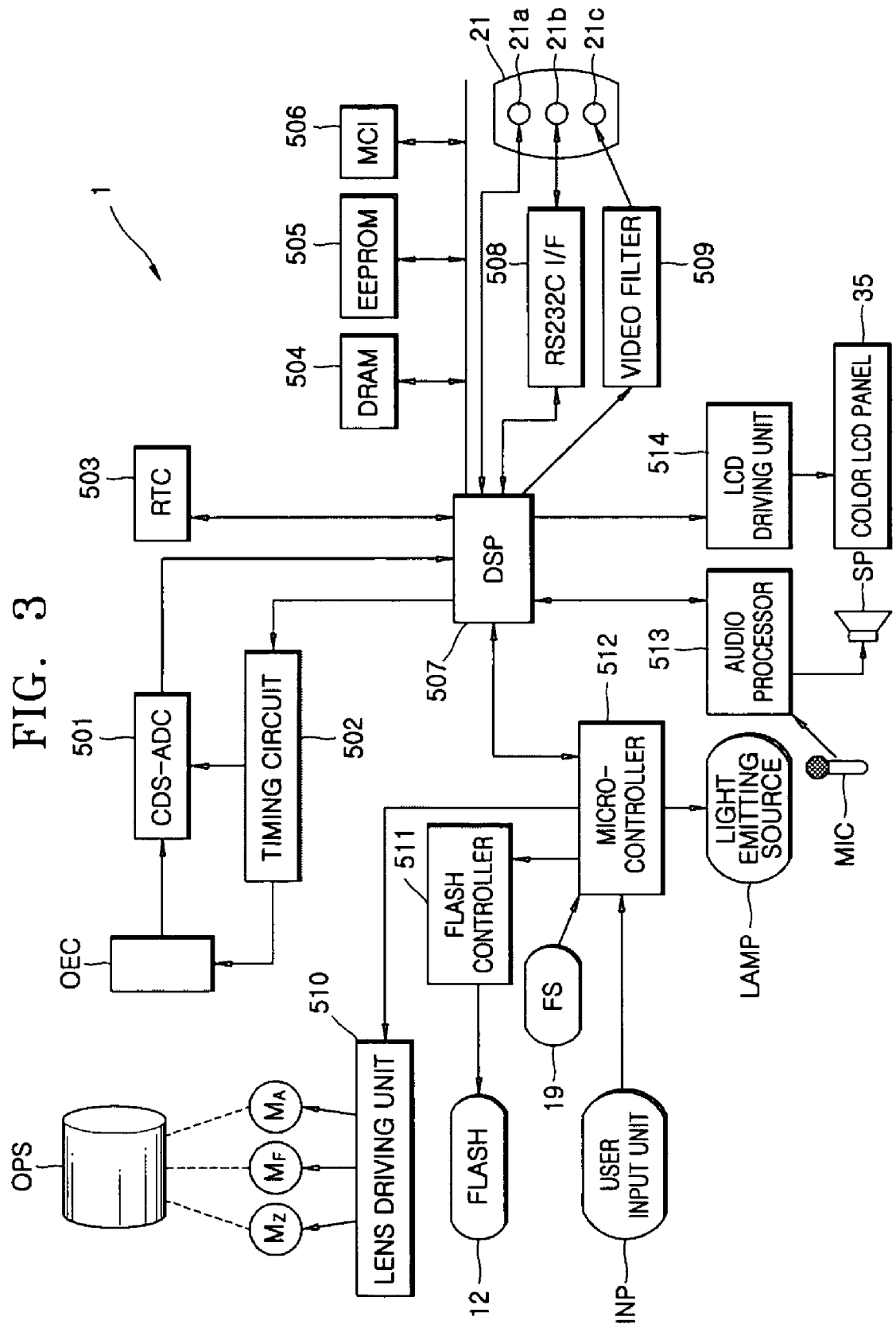
FIG. 3 is a block diagram illustrating components of the digital camera of FIG. 1.

FIG. 3 is a block diagram of the digital camera 1 of FIG. 1. Referring to FIGS. 1 through 3, the structure and operation of the digital camera 1 will be described.

An optical system OPS including the lens unit 20 and a filter unit (not shown) optically processes light reflected from an object.

The optical system OPS includes a zoom lens (not shown), a focus lens (not shown), and a compensation lens (not shown).

If a user presses the wide-angle zoom button $39_W$ or the telephoto zoom button $39_T$, which are included in a user input unit INP, a signal corresponding to the wide-angle zoom button $39_W$ or the telephoto zoom button $39_T$ is input to the micro-controller 512. Accordingly, as the micro-controller 512 controls a lens driving unit 510. Relative to the signal from buttons $39_W$, $39_T$, a zoom motor $M_Z$ operates, thereby moving the zoom lens. That is, if the wide-angle zoom button $39_W$ is pressed, a focal length of the zoom lens is shortened, thereby increasing a viewing angle. Conversely, if the telephoto zoom button $39_T$ is pressed, a focal length of the zoom lens is lengthened, thereby decreasing the viewing angle. Since the location of the focus lens is controlled while the location of the zoom lens is fixed, the viewing angle is hardly affected by the location of the focus lens.

In an automatic focusing mode, a main controller, for example a module embedded in the DSP 507, controls the lens driving unit 510 via the micro-controller 512, thus operating a focus motor $M_F$. Accordingly, the focus lens moves, and in this process, the location of the focus lens FL (e.g., a number of driving steps of the focus motor $M_F$) are set at which an image signal has the highest average frequency.

The lens unit 20 (FIG. 1) of the optical system OPS compensates for a refractive index, and thus does not operate independently. A motor $M_A$ drives an aperture (not shown).

The filter unit of the optical system OPS includes an optical low pass filter that removes high frequency optical noise components, and an infrared cut filter that blocks infrared components of incident light.

A photoelectric converter OEC is included in a charge couple device (CCD) or a complementary metal oxide semiconductor (CMOS) and converts light from the optical system OPS into electrical analog signals. The DSP 507 controls a timing circuit 502 to control operations of the photoelectric converter OEC and a correlation double sampler and analog-to-digital converter (CDS-ADC) 501. The CDS-ADC 501 processes the analog signals output from the photoelectric converter OEC, and converts the analog signals into digital signals after removing high frequency noise and altering the bandwidths of the analog signals.

A real-time clock (RTC) 503 provides time information to the DSP 507. The DSP 507 processes the digital signals output from the CDS-ADC 501, and generates digital image signals that are divided into brightness and chrominance signals.

A light emitting unit LAMP that is operated by the micro-controller 512 according to control signals output from the DSP 507 in which the main controller is embedded includes the self-timer lamp 11, the automatic-focus lamp 33, the mode indicating lamp $14_L$, and the flash standby lamp 34. The user input unit INP includes the shutter release button 13, the mode dial 14, the function buttons 15, the monitor button 32, the manual-focus/delete button 36, the manual-change/play button 37, the wide-angle zoom button $39_W$, and the telephoto zoom button $39_T$.

The digital image signal transmitted from the DSP 507 is temporarily stored in a dynamic random access memory (DRAM) 504. Algorithms and setting data needed for the operation of the DSP 507 are stored in an electrically erasable and programmable read-only memory (EEPROM) 505. A memory card is inserted into and removed from a memory card interface (MCI) 506.

The digital image signals output from the DSP 507 are input to an LCD driving unit 514, and through this operation, an image is displayed on the color LCD panel 35.

The digital image signals output from the DSP 507 can be transmitted in series communication via a universal serial bus (USB) connector 21a or an RS232C interface 508 and its connector 21b, or can be transmitted as video signals via video filter 509 and a video outputting unit 21c.

An audio processor 513 outputs audio signals from a microphone MIC to the DSP 507 or a speaker SP, and outputs audio signals from the DSP 507 to the speaker SP.

The micro-controller 512 operates the flash 12 by controlling a flash controller 511 according to a signal output from the FS 19.

The operation of the DSP 507 illustrated in FIG. 3 will now be described with reference to FIGS. 1 through 4.

Figure 4:
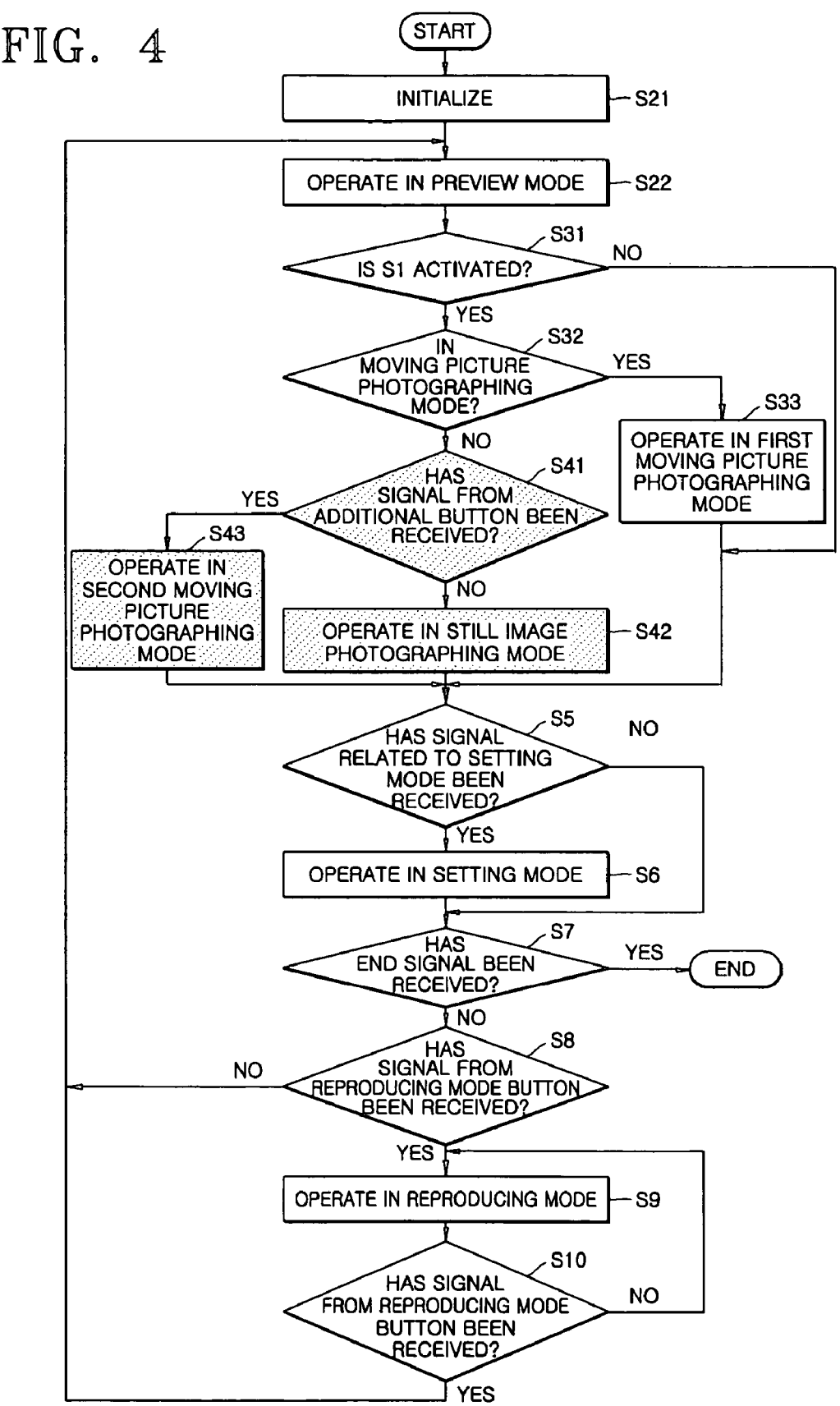
FIG. 4 is a flow chart illustrating a main operation of a digital signal processor shown in FIG. 3.

As shown in FIG. 4, when power is supplied to the digital camera 1, the DSP 507 performs initialization (S21) and enters a preview mode (S22). An input image is displayed on the color LCD panel 35 in the preview mode. Operations related to the preview mode will be described in more detail with reference to FIG. 8.

The DSP 507 determines whether the first signal S1 is activated, which occurs when a user presses the shutter release button 13 to the first step (S31).

If the first signal S1 is activated, the DSP 507 determines in step (S32) whether the camera 1 has been set in the moving picture photographing mode by the user (e.g., by moving the mode dial 14). If the moving picture photographing mode is set, the DSP 507 operates the camera 1 in a first moving picture photographing mode (S33). In the first moving picture photographing mode, the DSP 507 operates the camera 1 according to a predetermined (e.g., standard) photographing condition to photograph a moving picture. The operation of the camera 1 relative to the first moving picture photographing mode will be described hereafter in further detail with reference to FIG. 9.

Alternatively in step (S32) the DSP 507 determines that the photographing mode set by the user (e.g., by operating the mode dial 14) is not the moving picture photographing mode, but is rather one of the still image photographing modes (e.g., a simple photographing mode, a program photographing mode, a portrait photographing mode, a night scene photographing mode, and a manual photographing mode), the DSP 507 then checks in step (S41) whether a signal has been received from an additional button. Examples of the signal from the additional button can be a signal from the wide-angle zoom button $39_W$, the telephoto zoom button $39_T$, or the manual-focus/delete button 36. However, other buttons on the camera 1 may alternatively be employed as the additional button.

If a photographing mode set by the user is determined to be one of the still image photographing modes (S32) and the signal from the additional button is not input (S41), the DSP 507 operates the camera 1 in the user-set still image photographing mode (S42). That is, the DSP 507 operates the camera 1 in the user-set still image photographing mode, for example, according to a customized photographing condition set by the user for the user-set still image photographing mode. Operation of the camera 1 relative to the still image photographing mode will be described hereafter in more detail with reference to FIG. 10.

If a photographing mode set by the user by operating the mode dial 14 is one of the still image photographing modes (S32) and the signal from the additional button is determined to be present (S41), then the DSP 507 enters a second moving picture photographing mode (S43). In the second moving picture photographing mode, the DSP 507 operates the camera 1 to record a moving picture, but according to a photographing condition (e.g., user-customized still photographing setting) of the user-set still image photographing mode. Operation of the camera 1 relative to the second moving picture photographing mode will be described in more detail hereafter with reference to FIG. 11.

One can appreciate that, in the second moving picture photographing mode, since the moving picture is recorded by the camera 1 according to a still photographing condition (i.e., setting) of the set still image photographing mode, various still image photographing modes are provided for recording moving pictures. Further, advantageously, various moving picture photographing modes can be provided without adding further buttons, dial settings or the like. In addition, since whether to take a moving picture is determined on the basis of whether an additional button is pressed when the shutter release button 13 is pressed, switching between the moving picture photographing mode and one of the still image photographing modes becomes easier.

As shown in FIG. 4, if signals from the user input unit INP related to a set mode are detected by the DSP 507 in step (S5), the DSP 507 operates in a setting mode (S6). If an end signal is not generated, the DSP 507 continues to perform the following operations.

When a signal is activated by the input unit INP relative to a reproducing mode (S8) (e.g., reproducing mode button 42), a reproducing mode is entered in step (S9). In the reproducing mode, camera operating conditions are set according to input signals output from the user input unit INP, and the reproducing operation is performed. When a signal output from the reproducing mode button 42 is activated again (S10), the above operations are repeated.

Figure 5:
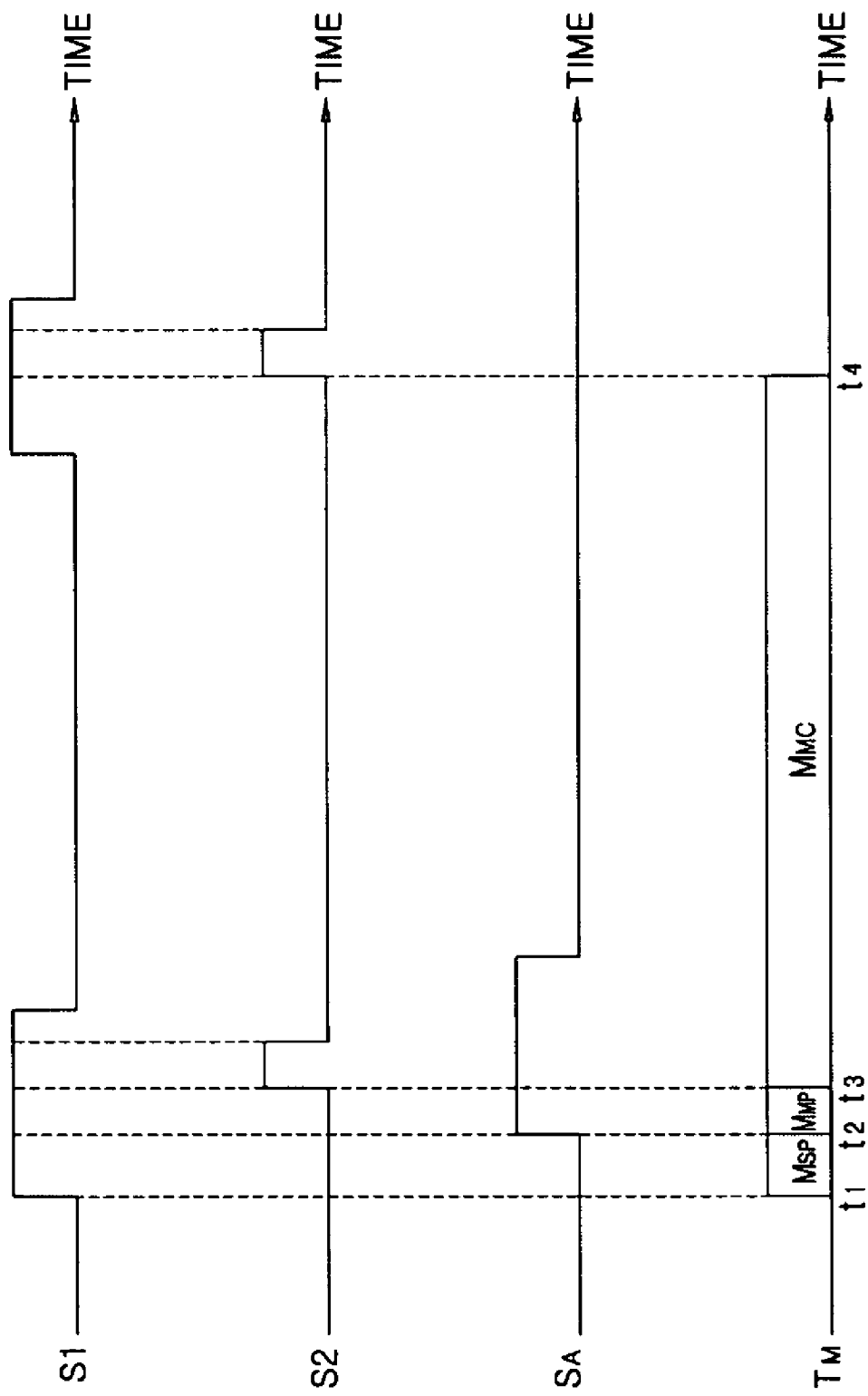
FIGS. 5 through 7 are timing diagrams illustrating operating modes of the digital signal processor according to signals output from a shutter release button and an additional button.

FIG. 5 is a timing diagram illustrating exemplary signals output from the shutter release button 13 and the additional button (e.g., the wide-angle zoom button $39_W$, the telephoto zoom button $39_T$ or the manual-focus/delete button 36) to activate the second moving picture photographing mode. In FIG. 5, S1 is the first step signal output from the shutter release button 13, S2 is the second step signal output from shutter release button 13, $S_A$ is a signal output from the additional button (e.g., the wide-angle zoom button $39_W$, the telephoto zoom button $39_T$ or the manual-focus/delete button 36), and $T_M$ illustrates an operating status of the DSP 507.

As shown in FIG. 5, the first signal S1 is activated at a time $t_1$. Having detected all of the following conditions: 1) the camera 1 is set in a still image photographing mode; 2) presence of the S1 signal; and 3) no signal from the additional button at time $t_1$, the DSP 507 performs a preliminary operation Msp comprising steps S4201 through S4210 (FIG. 10) of the still image photographing mode S42. That is, the DSP 507 performs one or more of the following operations including setting white balance, adjusting the aperture, setting exposure time, and focusing according to the photographing condition of the currently set still image photographing image. Thereafter, when a signal from the additional button (e.g., the wide-angle zoom button $39_W$, the telephoto zoom button $39_T$ or the manual-focus/delete button 36) is activated at a time $t_2$ (before the second signal S2 is activated), the DSP 507 performs another preliminary operation $M_{MP}$ comprising steps S4301 through S4310 (FIG. 11) to activate the camera 1 in the second moving picture photographing mode S43. Particularly, the camera 1 enters a moving picture photographing move relative to a user-selected condition of the current still image photographing mode. Next, if the second signal S2 is activated at a time $t_3$ when signals $S_1$ and $S_A$ are both active, the DSP 507 enters the second moving picture photographing mode S43 and performs a storing operation $M_{MC}$ comprising steps S4411 through S4414 (FIG. 11) to record a moving picture. When the second signal S2 is activated at a later time $t_4$ (e.g., by pressing the shutter release button 13 again), the DSP 507 stops recording the moving picture (FIG. 11 step S4415) and switches back to the still image photographing mode from the second moving picture photographing mode.

Figure 6:
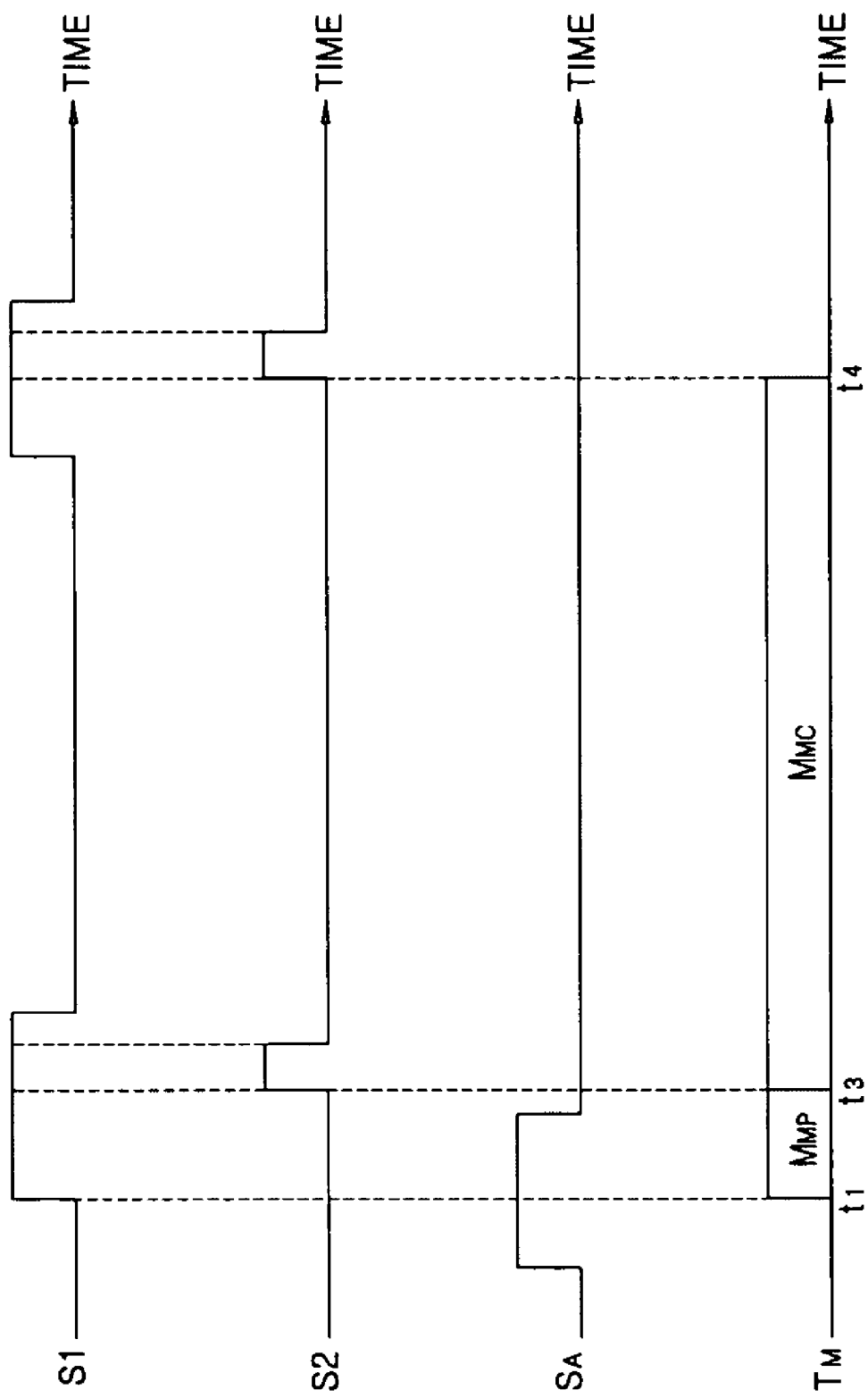

FIG. 6 is another timing diagram illustrating exemplary signals output from the shutter release button 13 and the additional button (e.g., the wide-angle zoom button $39_W$, the telephoto zoom button $39_T$ or the manual-focus/delete button 36). The reference characters in FIG. 6 that are the same as those in FIG. 5 refer to the same elements.

Referring to FIG. 6, signal SA is active before signal S1, such as in an instance when the user anticipates wanting to record a moving picture while the camera 1 is set to a still image photographing mode. Thus, when the first signal S1 and the signal from the additional button (e.g., the wide-angle zoom button $39_W$, the telephoto zoom button $39_T$ or the manual-focus/delete button 36) are both active at a time $t_1$, the DSP 507 performs a preliminary operation $M_{MP}$ comprising steps S4301 through S4410 (FIG. 11) to activate the camera 1 in the second moving picture photographing mode S43. As mentioned above with respect to FIG. 5, the camera 1 enters a moving picture photographing move with photographing settings relative to a user-selected condition of the currently selected still image photographing mode. Thereafter, when the second signal S2 is activated at a time $t_3$, the DSP 507 performs a storing operation $M_{MC}$ comprising steps S4411 through S4414 (FIG. 11) to record a moving picture. If the second signal S2 is activated again at a time $t_4$ (e.g., by the user pressing the shutter release button 13 again), the DSP 507 stops recording the moving picture (FIG. 11 step S4415) and switches back to the still image photographing mode from the second moving picture photographing mode.

Figure 7:
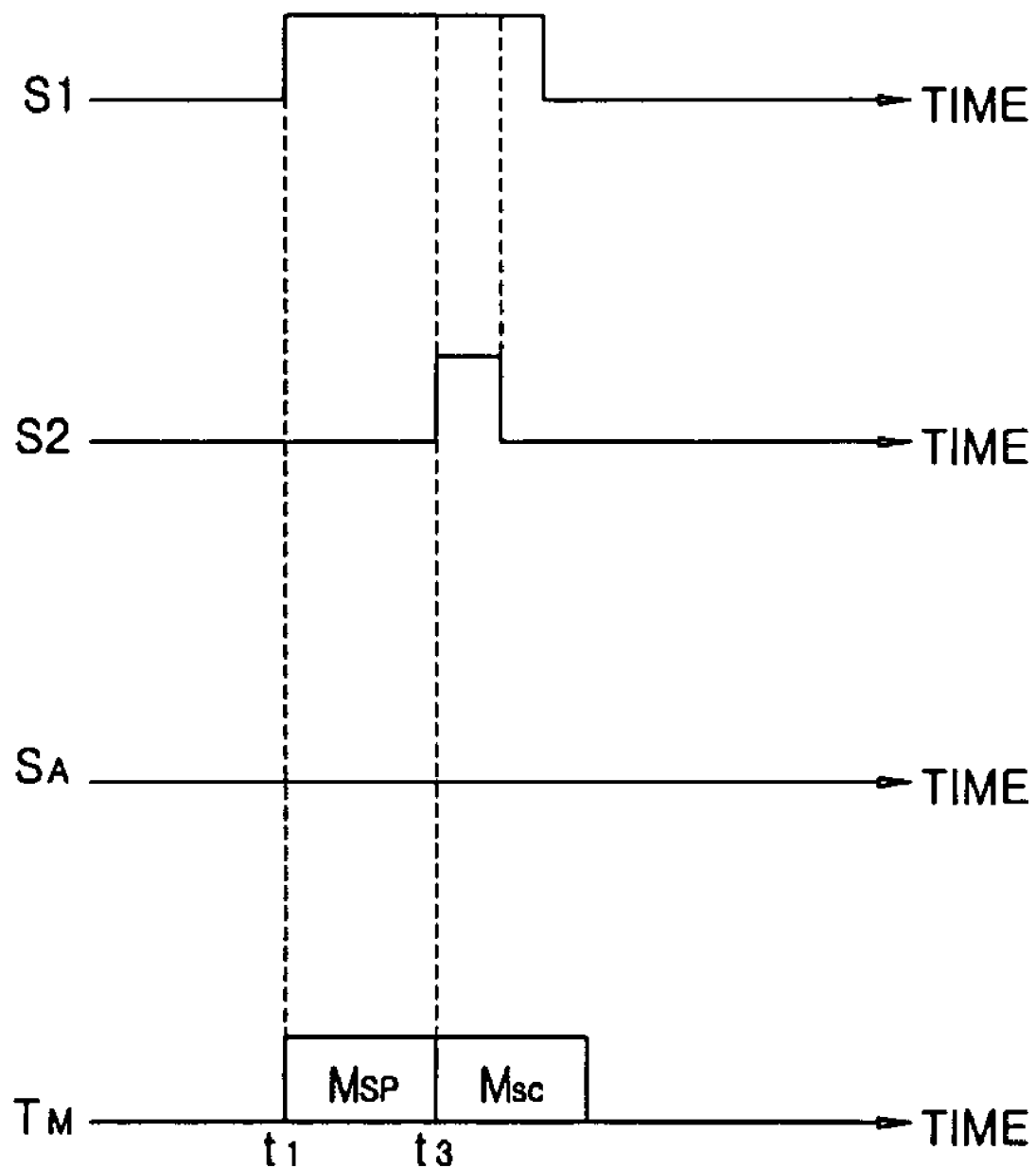

FIG. 7 is a timing diagram illustrating signals output from the shutter release button 13 and the additional button (e.g., the wide-angle zoom button $39_W$, the telephoto zoom button $39_T$ or the manual-focus/delete button 36) for taking a still photograph with the camera 1. The same reference characters in FIGS. 7 and 5 refer to the same elements.

Referring to FIG. 7, when the first signal S1 is activated at a time $t_1$, the DSP 507 performs a preliminary operation $M_{SP}$ comprising steps S4201 through S4210 (FIG. 10) in the user-selected still image photographing mode S42. When the signal from the additional button (e.g., the wide-angle zoom button $39_W$, the telephoto zoom button $39_T$ or the manual-focus/delete button 36) is not activated but the second signal S2 is activated at a time $t_3$, the DSP 507 performs a main operation $M_{SC}$ comprising steps S4211 through S4214 (FIG. 10) to capture and store a still image in the still image photographing mode S42. That is, when the camera 1 is set by the user in a still photographing mode and the additional button is not pressed before the second step shutter signal S2 is activated, the camera 1 simply takes a still photograph as known in the art.

Operations performed in the preview mode S22 (FIG. 4) will now be described with reference to FIGS. 1 through 3 and FIG. 8.

Figure 8:
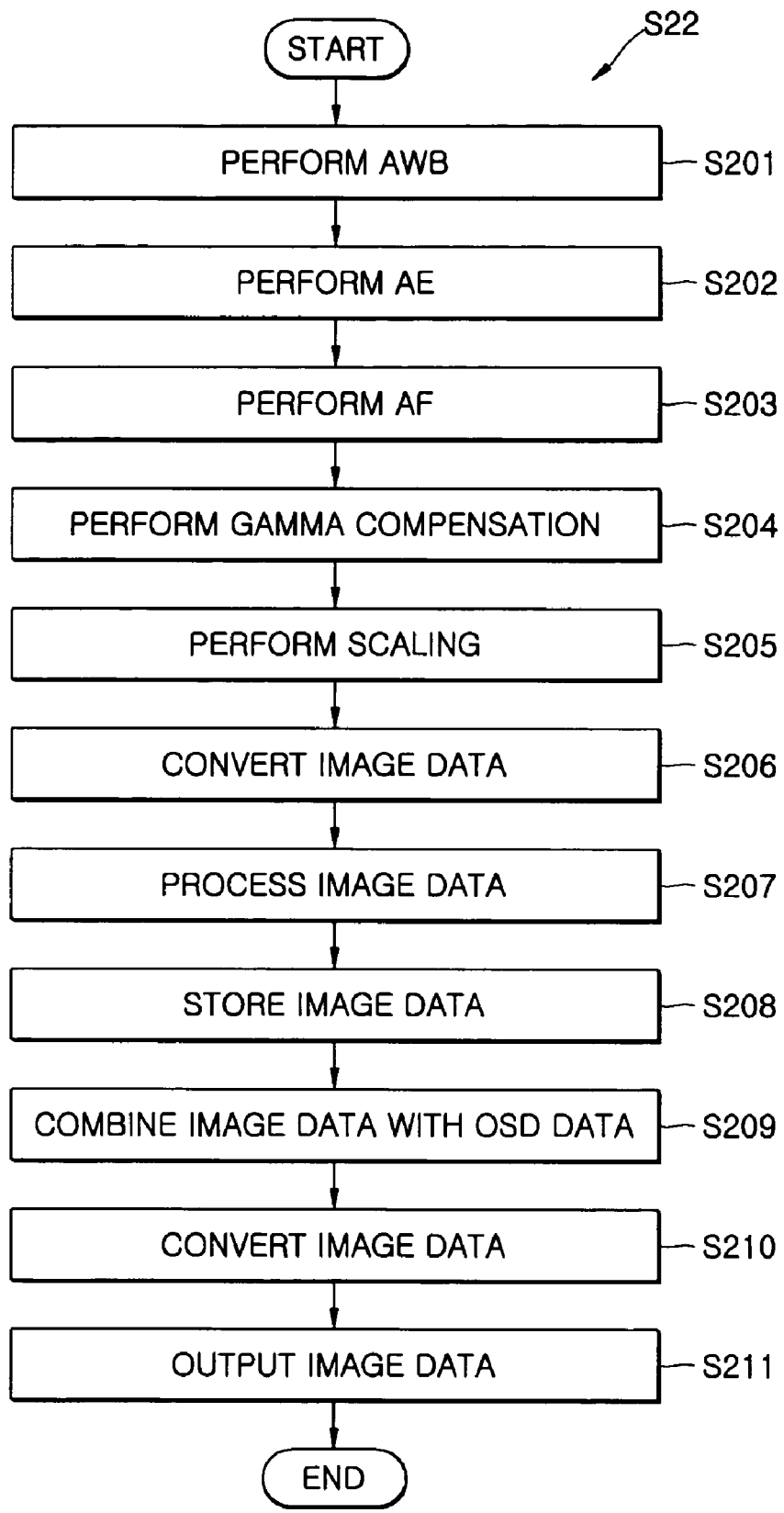
FIG. 8 is a flow chart illustrating details of a preview mode mentioned in FIG. 4.

As shown in FIG. 8, first, the DSP 507 performs an automatic white balance (AWE), and sets parameters related to white balance (S201)

When in an automatic exposure (AE) mode (S202), the DSP 507 calculates the exposure by measuring incident luminance, and sets a shutter speed by driving the aperture driving motor $M_A$ according to the calculated exposure (S203).

Then, the DSP 507 performs gamma compensation on the input image data (S204), and scales the gamma compensated input image data so that the image fits the display (S205).

Next, the DSP 507 converts the scaled input image data from red-green-blue data to brightness-chromaticity data (S206). The DSP 507 processes the input image data according to, for example, a resolution or a display location, and performs filtering (S207).

Then, the DSP 507 temporarily stores the input image data in the DRAM 504 (see FIG. 3) (S208).

The DSP 507 combines the input image data temporarily stored in the DRAM 504 with on-screen display (OSD) data (S209). Then, the DSP 507 converts the combined image data from brightness-chromaticity data to red-green-blue data (S210), and outputs the image data to the LCD driving unit 514 (see FIG. 3) (S211).

Figure 9:
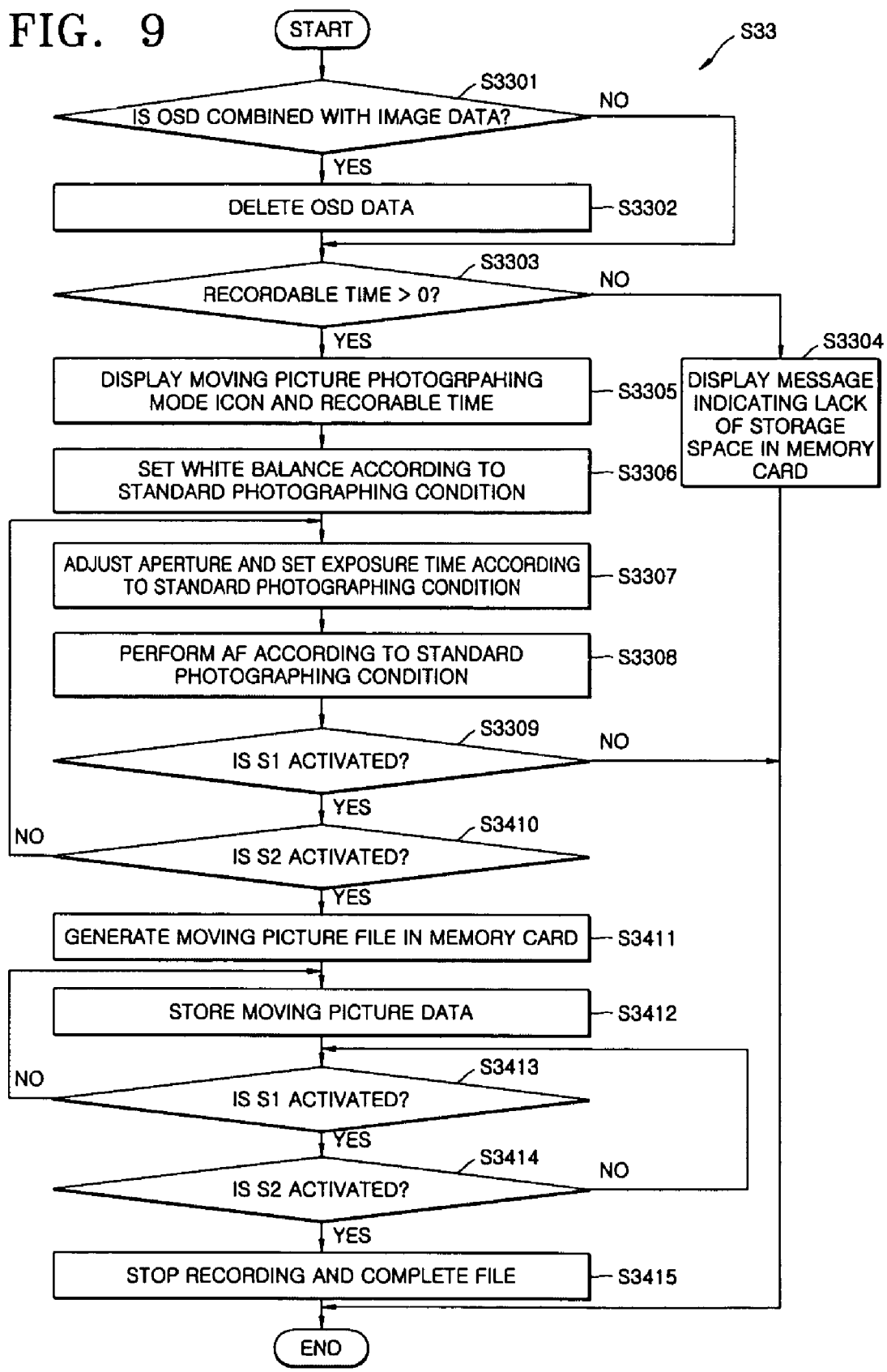
FIG. 9 is a flow chart illustrating details of a first moving picture photographing mode mentioned in FIG. 4.

FIG. 9 is a flow chart illustrating operations performed in the first moving picture photographing mode S33 mentioned in FIG. 4. Referring to FIGS. 1 through 3 and 9, the operations performed in the first moving picture photographing mode S33 will be described in detail.

As shown in FIG. 8, first, when the DSP 507 determines that OSD data is combined with the currently output image data (S3301), the DSP 507 deletes the OSD data (S3302).

The DSP 507 detects storage space available in the memory card, which is an exemplary storing medium, and determines whether there is enough available storage space to store digital moving picture data (S3303). If there is not enough available storage space, the DSP 507 indicates to the user that there is a lack of storage space in the memory card (S3304). For example, as can be appreciated from FIG. 3, the DSP 507 cooperates with the driver 514 to provide a warning icon or text on display 35. If the DSP 507 determines that the storing medium has sufficient storage space, the following operations are performed.

The DSP 507 displays a moving picture photographing mode symbol and a recordable time on the color LCD panel 35 (S3305). Then, the DSP 507 sets a white balance according to a standard (e.g., factory predetermined settings) photographing condition of the moving picture photographing mode, and sets parameters related to the white balance (S3306). Next, the DSP 507 operates an AE mode according to the standard photographing condition of the moving picture photographing mode (S3307). That is, exposure is calculated by measuring incident luminance, the aperture driving motor $M_A$ is driven according to the calculated exposure, and an exposure time is set. Then, the DSP 507 performs AF according to the standard photographing condition and drives the focus lens (S3308).

Now ready to record a moving picture, the DSP 507 awaits the first shutter signal S1 (S3309) and performs the following operations upon its activation.

First, the DSP 507 determines whether the second signal S2 is activated (S3410). If the second signal S2 is not activated the user has not pressed the shutter release button to the second step, and thus, the DSP 507 repeats operations S3307 through S3410.

However, if the second signal S2 is activated, the user has pressed the shutter release button 13 to the second step, and thus the DSP 507 generates a moving picture file in the memory card (S3411). The DSP 507 compresses the moving picture data output from the CDS-ADC 501 (FIG. 3) using a compression algorithm such as, for example, moving picture experts group (MPEG) or motion joint photographic experts group (MJPEG), and then stores the compressed moving picture data in the moving picture file (S3412).

During the foregoing operations of compressing and storing the moving picture as described above, if both the first and second signals S1 and S2 are again activated (S3413 and S3414), the DSP 507 stops storing the input moving picture data and completes the moving picture file (S3415).

Figure 10:
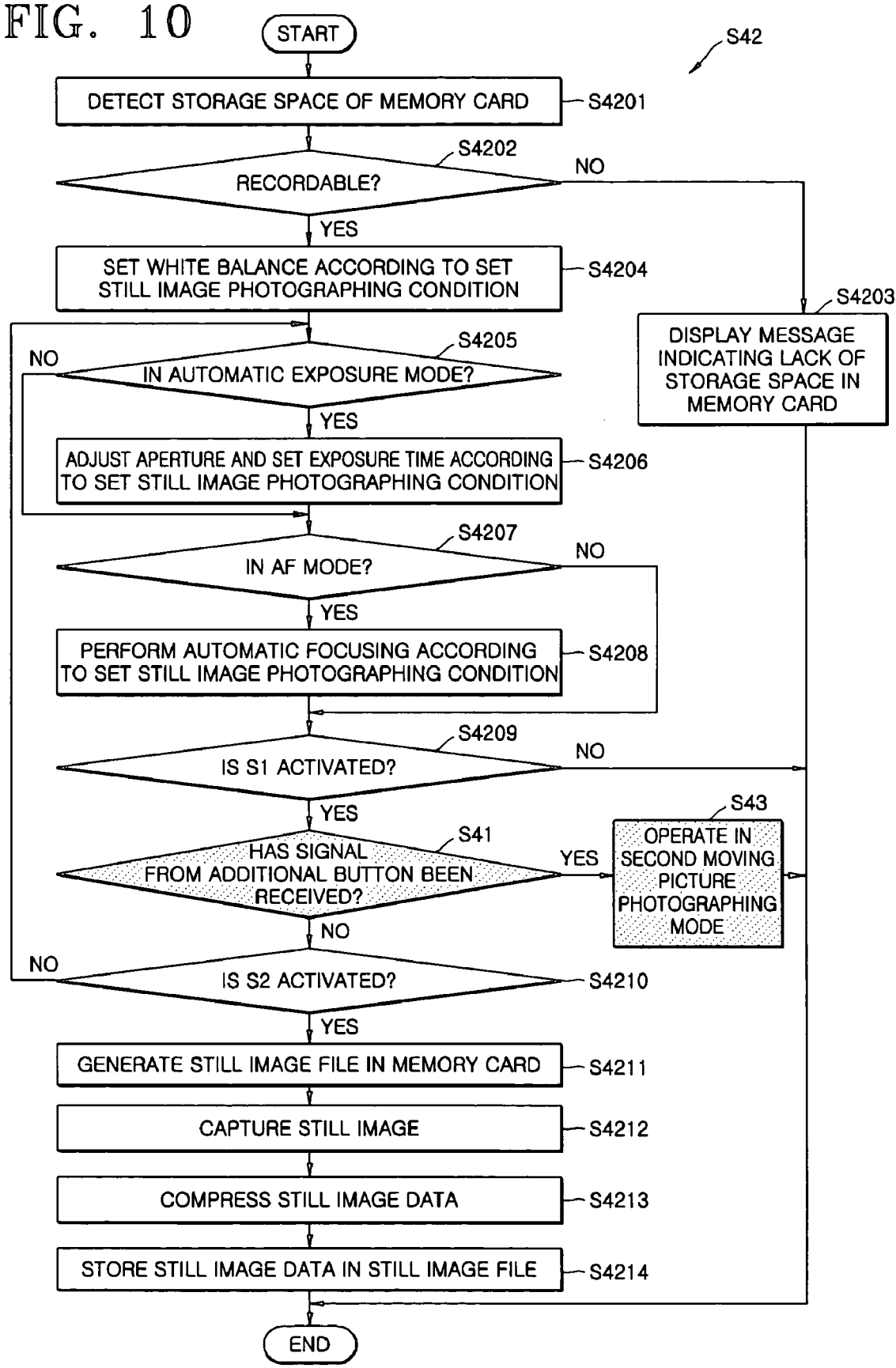
FIG. 10 is a flow chart illustrating details of a still image photographing mode mentioned in FIG. 4.

FIG. 10 is a flow chart illustrating camera operation relative to the still image photographing mode S42 mentioned in FIG. 4. Referring to FIGS. 1 through 3 and 10, the operations performed in the still image photographing mode S42 will now be described. Here, a location of the zoom lens may be set in advance (i.e., before step S4201 of FIG. 4).

The DSP 507 detects storage space of the memory card (S4201) and determines whether there is enough space to store digital image data (S4202). If there is not enough storage space, the DSP 507 indicates that there is a lack of storage space in the memory card and then exits the still image photographing mode S42 (S4203). If storage of a digital still image is possible, the following operations are performed.

First, the DSP 507 sets a white balance according to the currently set still image photographing condition, and sets parameters related to the white balance (S4204).

Then, when in an AE mode (S4205), the DSP 507 calculates the exposure by measuring incident luminance, drives the aperture driving motor $M_A$ according to the calculated exposure, and sets an exposure time (S4206).

When in an AF mode (S4207), the DSP 507 performs automatic focusing and drives the focus lens (S4208).

Then, if the first signal S1 is not activated (S4209), the DSP 507 recognizes by way of its programmed software logic that the user has no intention of photographing an image, and thus the DSP 507 exits the still image photographing mode S42. The DSP 507 may enter a sleep or standby state wherein it waits to receive a user input signal from one of the buttons (e.g., shutter button 13).

However, if the DSP 507 detects that both the first signal S1 and a signal from an additional button (e.g., the wide-angle zoom button $39_W$, the telephoto zoom button $39_T$ or the manual-focus/delete button 36) are active together in step S41 (which is the case illustrated in FIGS. 5 and 6), the DSP 507 operates the camera 1 in the second moving picture photographing mode S43. Further, the DSP 507 readies the camera 1 to take a moving photograph according to a currently set still photographing condition of the still image photographing mode.

Alternatively, if the first signal S1 is activated and a signal from the additional button is inactive in step S41, the following operations are performed.

First, the DSP 507 determines whether the second signal S2 is activated (S4210). If the second signal S2 is not activated the user has not pressed the shutter release button to the second step to take a photograph, and thus, the DSP 507 repeats operations S4205 through S4210.

If the second signal S2 is activated, the user has pressed the shutter release button 13 to the second step to take a photograph and the DSP 507 generates a still image file in the memory card (S4211). Then, the DSP 507 captures an image (S4212). That is, the DSP 507 receives still image data from the CDS-ACD 501 (FIG. 3). Then, the DSP 507 compresses the received still image data (S4213), and stores the compressed still image data in the still image file (S4214).

Figure 11:
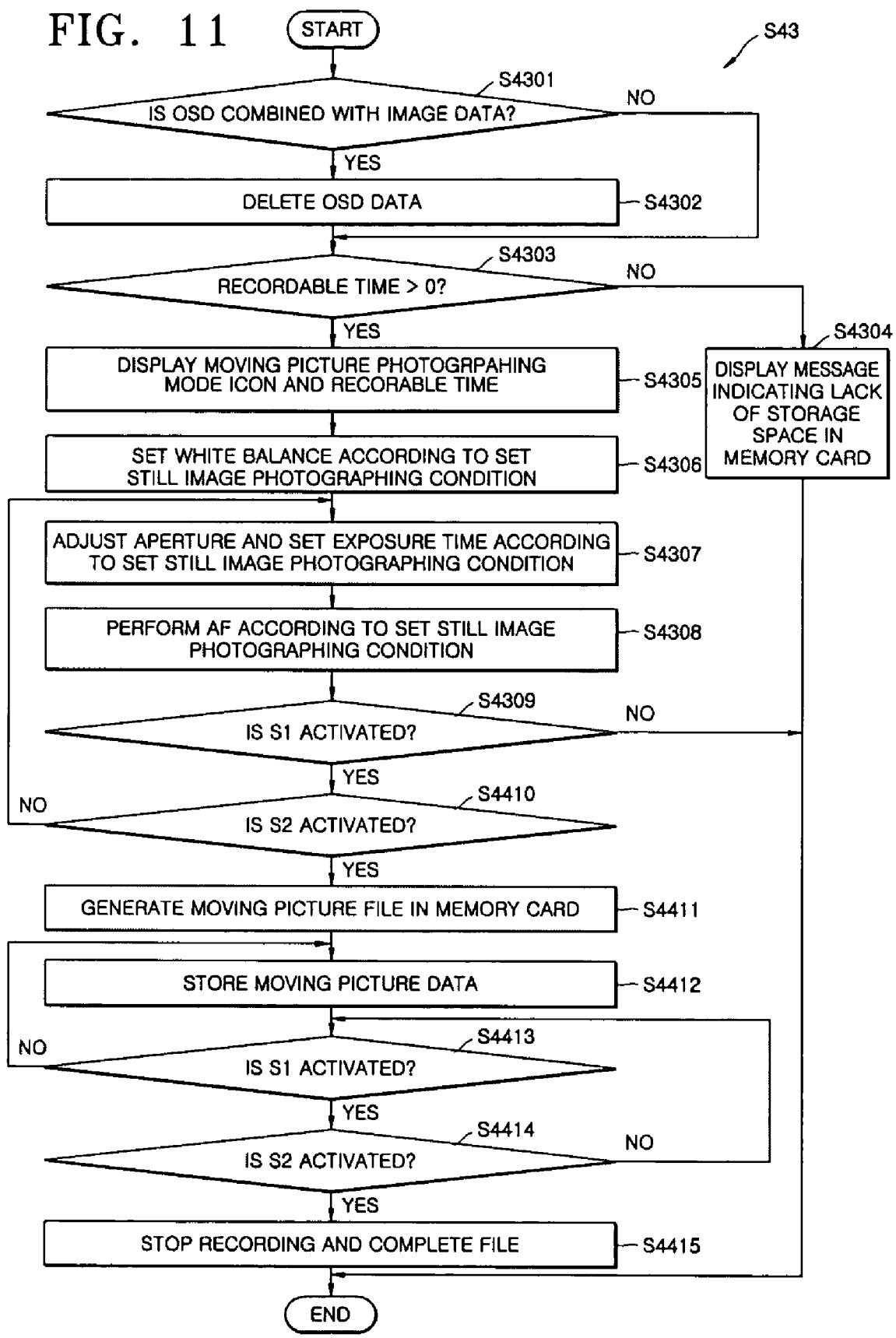
FIG. 11 is a flow chart illustrating details of a second moving picture photographing mode mentioned in FIGS. 4 and 10.

FIG. 11 is a flow chart illustrating operations performed in the second moving picture photographing mode S43 mentioned in FIGS. 4 and 10. One can appreciate that the first and second moving picture photographing modes are quite similar in operation by comparing FIGS. 9 and 11. Therefore, only the differences between the first and second moving picture photographing modes S33, S43 will be discussed.

As shown in FIG. 11, in step S4306, the DSP 507 sets a white balance according to the conditions of a still image photographing mode that is set by the user (e.g., by operating the mode dial 14 of FIG. 2). Also, in step S4307, the DSP 507 performs AE according to the user-set still image photographing condition. That is, exposure is calculated by measuring incident luminance, the aperture driving motor $M_A$ is driven according to the calculated exposure, and an exposure time is set. Similarly, in step S4308, the DSP 507 performs AF according to the user-set still image photographing condition and drives the focus lens.

Therefore, since a moving picture can be photographed on the basis of the user-set still photographing settings of a selected still image photographing mode, various still image photographing modes can be used to provide various moving picture photographing modes (e.g., a moving picture night photographing mode, a moving picture fast action photographing mode, a moving picture manual exposure photographing mode, etc.) That is, various moving picture photographing modes are effectively provided.

Figure 12:
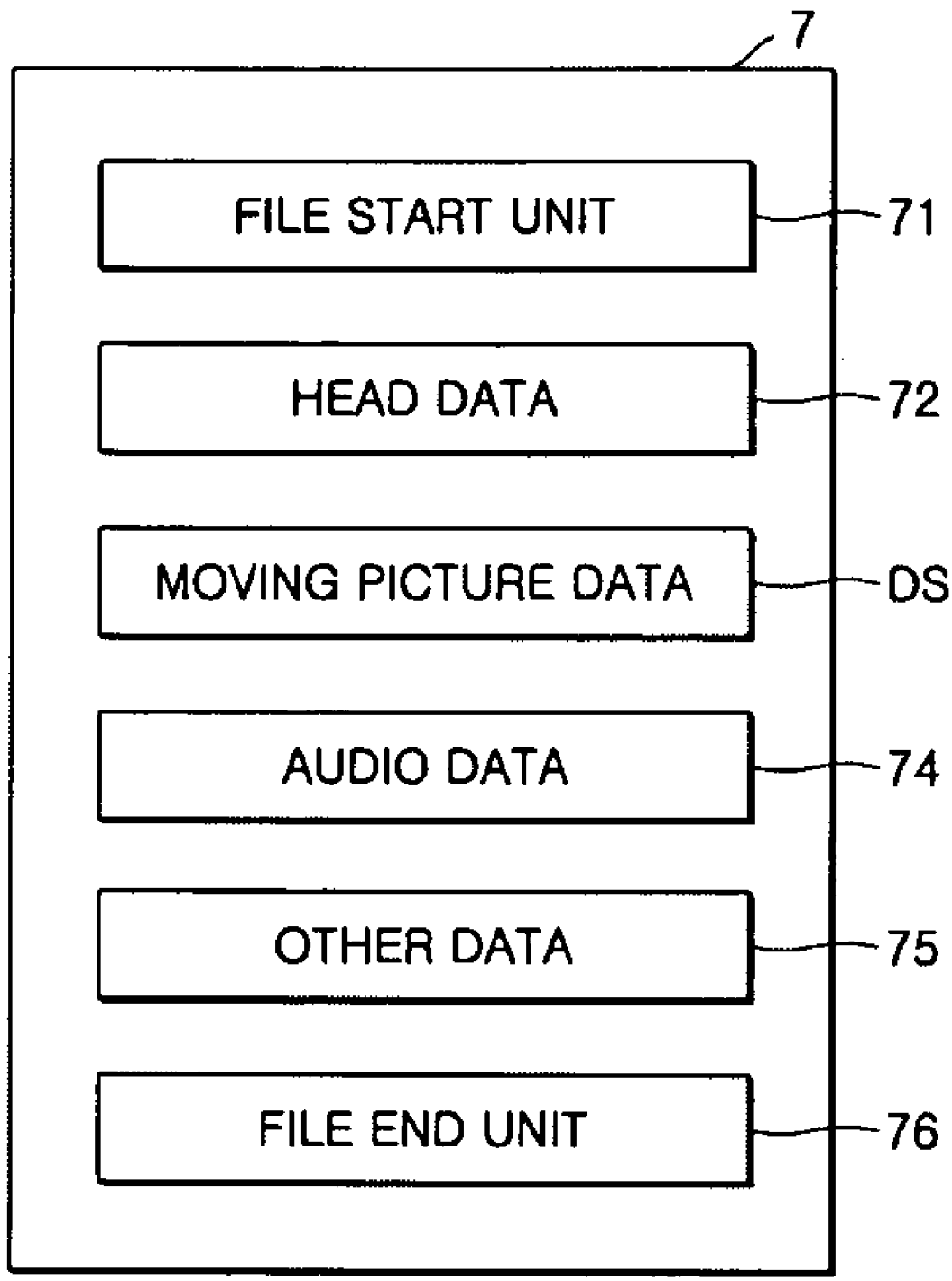
FIG. 12 is a block diagram illustrating a moving picture file exemplary data structure which is obtained by operating the digital camera of FIG. 1 in the first or second moving picture photographing mode mentioned in FIG. 4.

Referring to FIG. 12, a file start unit 71, head data 72, moving picture data DS, audio data 74, other data 75, and a file end unit 76 are stored in a moving picture file 7 obtained by operating the digital camera 1 in the first and second moving picture photographing modes S33, S43 of FIG. 4. The file start unit 71 includes data indicating the start of the picture files. The head data 72 includes data indicating a file format. The audio data 74 corresponding to the moving picture data DS is stored in the same moving picture file 7. The other data 75 includes subtitle data created according to a selection of a user. The file end unit 76 includes data indicating the end of the file.

FIG. 13 is an additional timing diagram illustrating signals output from the shutter release button 13 and the additional button (e.g., the wide-angle zoom button $39_W$, the telephoto zoom button $39_T$ or the manual-focus/delete button 36) for taking a still photograph with the camera 1. The same reference characters in FIGS. 13 and 5 refer to the same elements.

Referring to FIG. 13, when the first signal S1 is activated at a time $t_1$, the DSP 507 performs a preliminary operation $M_{SP}$ comprising steps S4201 through S4210 (see FIG. 10) in the user-selected still image photographing mode S42. When the second signal S2 is activated at a time $t_3$, the DSP 507 performs a main operation $M_{SC}$ comprising steps S4211 through S4214 (see FIG. 10) to capture and store a still image in the still image photographing mode S42. After the time t₃, the DSP 507 ignores the signal from the additional button (e.g., the wide-angle zoom button 39$_W$, the telephoto zoom button 39$_T$ or the manual-focus/delete button 36). Therefore, the DSP 507 continues the main operation M$_{SC}$ comprising steps S4211 through S4214 (see FIG. 10) in the still image photographing mode S42.

Referring to FIGS. 4 and 13, at a time t₁ when the first signal S1 is activated (S31), the current operating mode is one of the still image photographing modes, and not the moving picture photographing mode (S32), and the signal from the additional button is deactivated (S41), the DSP 507 performs a preliminary operation M$_{SP}$ comprising steps S4201 through S4210 (see FIG. 10) in the still image photographing mode S43 (see FIG. 4) according to a photographing condition of the currently set still image photographing mode. Since operations S41 and S43, which relate to the signal output from the additional button, are not part of the preliminary operations M$_{SP}$, the DSP 507 ignores the signal output from the additional button. Therefore, if the second signal S2 is activated at a time t3, the DSP 507 performs a main operation M$_{SC}$ comprising steps S4211 through S4214 (see FIG. 10) in the still image photographing mode S42.

As described above, according to a method of controlling a digital photographing apparatus and a digital photographing apparatus using the method, a moving picture can be photographed according to a photographing condition of a still image photographing mode set by a user. Thus, various still image photographing modes can be used to provide various moving picture photographing modes. That is, various moving picture photographing modes can be efficiently performed. In addition, whether to set a moving picture photographing mode is determined according to whether or not a particular setting button is pressed when a shutter release button is pressed. Thus, toggling between the moving picture photographing mode and the sill image photographing mode is more convenient.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a digital photographing apparatus having a still image photographing mode and a moving picture photographing mode, the method comprising the steps of:
   actuating a shutter release button to activate a first signal;
   determining which of the still image photographing mode and the moving picture photographing mode is a set mode;
   actuating a second button to activate a second signal;
   detecting if the first and second signals are active simultaneously, and
   photographing an image according to a photographing condition of the set mode;
   wherein the second button is selected from the group consisting of a wide-angle zoom button, a telephoto zoom button, and a manual-focus/delete button.

2. The method according to claim 1 wherein the photographing step comprises:
   actuating the shutter release button to activate a third signal;
   detecting if sufficient storage space for the image exists in a storage medium;
   setting a white balance;
   adjusting an aperture and set exposure time;
   focusing an optical system on the image;
   generating an image file in the storage medium; and
   storing image data to the image file.

3. The method according to claim 2 wherein the set mode is the moving picture photographing mode, the method further comprising the steps of:
   actuating the shutter release button a second time to activate the first and third signals;
   stopping image data to the image file; and
   completing the image file.

4. The method according to claim 2 wherein the set mode is the still image photographing mode and the first and second signals not being active simultaneously, the storing step further comprising:
   capturing a still image;
   compressing image data relative to the still image; and
   recording the image data to the image file.

5. The method according to claim 2 wherein the set mode is the still image photographing mode and the first and second signals being active simultaneously, the storing step further comprising
   capturing a moving picture;
   compressing moving picture data relative to the moving picture; and
   recording the moving picture data to the image file.

6. The method according to claim 5 wherein the storing step further comprises:
   actuating the shutter release button a second time to activate the first and third signals;
   stopping moving picture data to the image file; and
   completing the image file.

7. The method of claim 1 wherein the second button is at least one button from a user input unit comprising a plurality of buttons.

8. A digital photographing apparatus comprising:
   an optical system that receives light from a subject to be photographed by the apparatus;
   a digital processor that receives signals representing the light received by the optical system and generates an image file in a storage medium relative to the signals;
   a user input unit in communication with the digital processor, the user input unit comprising a mode selector, a shutter release button and a second button;
   and wherein the user presses the shutter release button and the second button substantially together to record a moving picture when the mode selector actuated by the user to set the apparatus to a still image photographing mode;
   wherein the second button is selected from the group consisting of a wide-angle zoom button, a telephoto zoom button, and a manual-focus/delete button.

9. The apparatus of claim 8 wherein the second button is one of a plurality of setting buttons that are operative to set a photographing condition relative to the mode selector.

10. The apparatus of claim 8, wherein the shutter release button has a first position that activates a preliminary operation of the apparatus and a second position that activates a main operation of the apparatus.

11. The apparatus of claim 10, wherein if the mode selector is set to a still image photographing mode and during the preliminary operation, the digital processor detects if sufficient storage space for the image file exists in a storage medium, sets a white balance, adjusts an aperture and set exposure time, and focuses the optical system on the subject.

12. The apparatus of claim 10, wherein if the mode selector is set to a still image photographing mode and during the main operation, the digital processor generates moving picture data and sends the moving picture data to the image file.

13. A digital camera comprising:
mode setting means for placing the camera in at least a still image photographing mode having a still image setting and a first moving picture photographing mode having a moving picture setting different from the still image setting;
dual-stage shutter means for, in a first stage, readying a processor means to generate and store image data for a subject relative to the mode setting means, and for activating the processor means for generating and storing image data for the subject in a second stage; and
mode switching means that cooperates with the dual-stage shutter means for placing the camera in a second moving picture photographing mode having the still image setting;
wherein the mode switching means comprises a user input button disposed on the camera for setting a photographing condition; and
wherein the user input button is selected from the group consisting of a wide-angle zoom button, a telephoto zoom button, and a manual-focus/delete button.

14. The digital camera according to claim 13, wherein the dual-stage shutter means comprises a two-step activation button that activates a first signal when pressed to a first position, and activates a second signal when pressed to a second position.

15. The digital camera according to claim 14, wherein the mode switching means activates a third signal when actuated, the processor means operating the camera in the second moving picture photographing mode when the processor means receives the first and third signals substantially together.

16. The digital camera according to claim 13 wherein a processing means comprises at least one of a digital signal processor and a micro-controller.

* * * * *